United States Patent [19]

Cope

[11] Patent Number: 5,120,981
[45] Date of Patent: Jun. 9, 1992

[54] WINDSHIELD WIPER SYSTEM ACTIVATED LIGHTING

[76] Inventor: Robert Cope, P.O. Box 1326, Indiantown, Fla. 34956

[21] Appl. No.: 442,841

[22] Filed: Nov. 28, 1989

[51] Int. Cl.⁵ .......................... B60L 1/14; B60Q 1/08; B60Q 1/20
[52] U.S. Cl. ....................................... 307/10.8; 315/82
[58] Field of Search ................ 307/10.1, 10.8; 315/82, 315/83, 200 R; 340/425.5

[56] References Cited

U.S. PATENT DOCUMENTS

| | | | |
|---|---|---|---|
| 4,010,383 | 3/1977 | Grassmann | 307/10.1 X |
| 4,097,839 | 6/1978 | Lesiak | 340/425.5 |
| 4,495,444 | 1/1985 | Thomas | 307/10.8 |
| 4,683,403 | 7/1987 | Iwamoto | 315/83 |

Primary Examiner—A. D. Pellinen
Assistant Examiner—Fritz Fleming
Attorney, Agent, or Firm—Richard L. Miller

[57] ABSTRACT

A switching system is provided that automatically turns on automobile headlights when the windshield wiper is turned on. Two embodiments are provided: one using relays to perform the switching function, and one using digital logic. A third embodiment allows for the addition of multi-speed windshield wipers and fog lights. When the windshield wipers are set to low speed, the headlights are automatically turned on. When they are set to high speed, the headlights and fog lights are automatically turned on.

1 Claim, 1 Drawing Sheet

ND LIGHTING

BACKGROUND OF THE INVENTION

The instant invention relates generally to the field of electronic control circuits, and, more specifically to circuits that enhance automotive safety. At the present state of the art, automobiles are equipped with a number of safety features that improve the ability of the driver to see and be seen by other drivers and pedestrians. In particular, automobiles are equipped with headlights and windshield wipers, and, optionally, fog lights. Each of these systems operate independently of each other.

It is possible, under conditions of fatigue and stress to operate these inefficiently, dangerously, or illegally. instance, whenever it is raining hard enough to require the use of windshield wipers it is also advisable to use headlights. If rain is really heavy requiring the use of high the high speed wiper mode available on many automobiles, the concurrent use of fog lights is advised However, many motor vehicle operators do not remember to use all of the safety systems available to them.

A number of inventions have been offered which address these issues including: an automatic wiper and light control (by T. Glaze, U.S. Pat. No. 3,824,405), an automatic headlight control system (by T. Hahn, U.S. Pat. No. 4,337,400), and a windshield wiper system activated lighting (by W. Lesiak, U.S. Pat. No. 4,097,839); however, each of these systems uses electromechanical switching means, none address the use of multi-speed windshield wipers and fog lights.

SUMMARY OF THE INVENTION

It is, therefore, a primary object of the present invention to provide a switching system that uses electromechanical controls to automatically turn on automobile headlights when the windshield wiper switch is activated.

A further object is to provide a switching system uses electronic logic to automatically turn on automobile headlights when the windshield wiper switch is activated.

A yet further object is to provide a switching system that uses electronic logic to automatically turn on headlights when the windshield wiper is activated at either high or low speed and also automatically turns on fog lights when the windshield wiper is operated at high speed.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWINGS FIGURES

The FIGS. in the drawings are briefly described as follows.

DETAILED DESCRIPTION OF THE PREFERRED EMBODIMENTS

Figure 1:
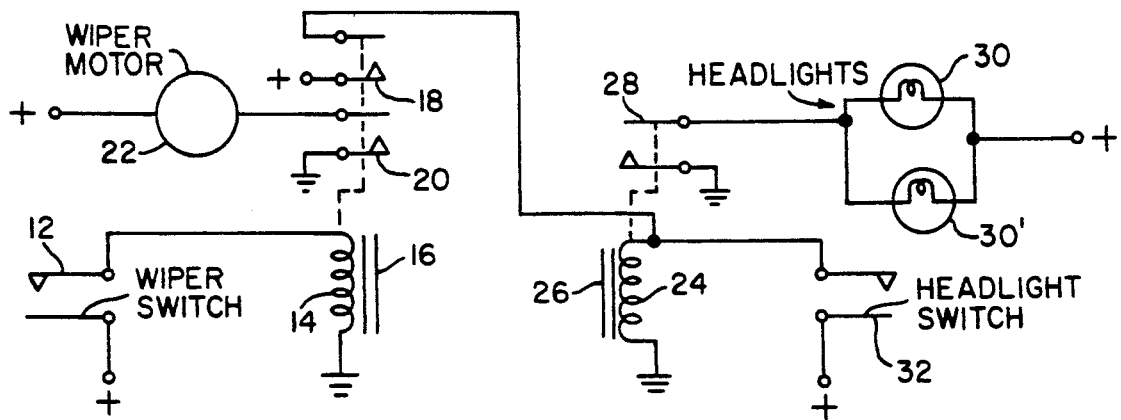
FIG. 1 is an electronic schematic diagram of the invention using dual relays to perform switching.

FIG. 1 illustrates an embodiment of the invention using dual relays to perform switching. In operation, when wiper switch 12 is closed, solenoid 14 of relay RY1, numeral 16, is energized causing contact SW1A, numeral 18 and contact completing a wiper motor operating circuit SW1B, numeral 20, to close. Contact 20 operates wiper motor 22. Contact 18 energizes solenoid 24 of relay RY2, numeral 26, causing contact SW2, numeral 28, to close. Contact 28 completes a headlight operating circuit to operate headlights 30. Hence if wiper switch 12 is operated, wiper motor 22 and headlights 30, 30' operate; yet if headlight switch 32 is operated, only headlights 30, 30' operate.

Figure 2:
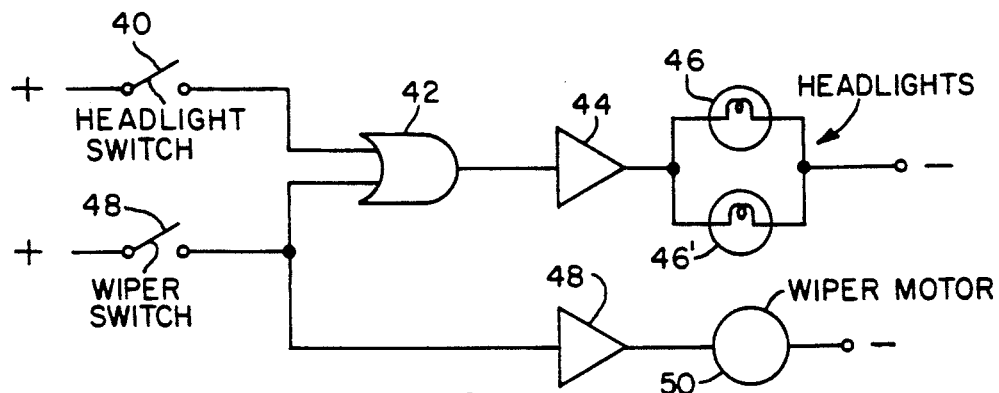
FIG. 2 is an electronic schematic diagram of an alternative embodiment of the invention using electronic logic to perform switching.

FIG. 2 illustrates an embodiment of the invention using electronic logic to perform switching. In operation, when headlight switch 40 is operated, 2-input OR gate 42 outputs a signal to headlight driver 44 and only headlights 46, 46' operate. However, when wiper switch 48 is operated, 2-input OR gate 42 outputs a signal to headlight driver 44 which turns on headlights 46, 46' while at the same time, wiper motor driver 48 turns on wiper motor 50. Hence, the same functionality is achieved as the circuit illustrated in FIG. 1.

Figure 3:
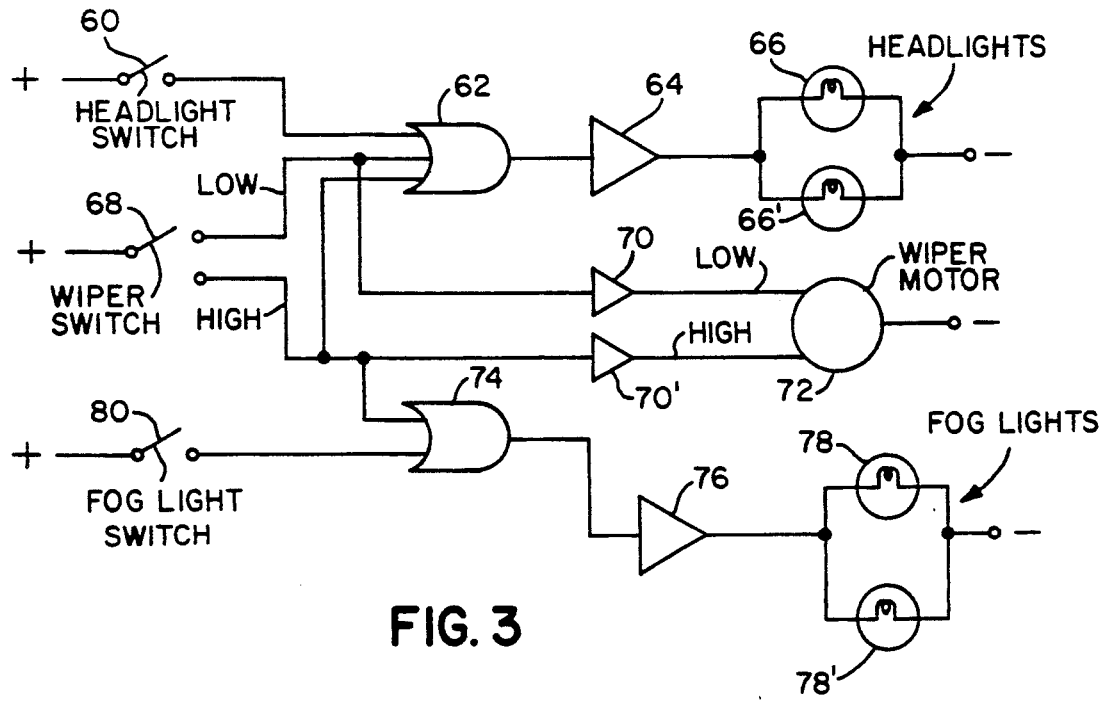
FIG. 3 is an electronic schematic diagram of an alternative embodiment of the invention that switches headlights on when the wiper switch is set to the "LOW" position and turns on both the headlights and the fog lights when the wiper switch is set to the "HIGH" position.

The circuit illustrated in FIG. 3 provides control circuit which allows for the use of multi-speed windshield wipers as well as fog lights. When headlight switch 60 is operated, 3-input OR gate 62 of the control circuit outputs a signal to headlight driver 64 which operates a lighting circuit of headlights 66, 66'. When contacts of wiper switch 68 are set to the LOW position, 3-input OR gate 62 outputs a signal to headlight driver 64, operating headlights 66, 66'; also wiper motor driver 70 of the control circuit is connected to a low speed circuit input of a dual-wiper motor 72 and energized the low speed mode of wiper motor 72. When contacts of wiper switch 68 are set to the HIGH position, 3-input OR gate 62 outputs a signal to headlight driver 64 of the control circuit, operating lighting circuit of headlights 66; also wiper motor driver 70' is connected to a high speed circuit input of wiper motor 72 and of the control circuit energizes the high speed mode of wiper motor 72; and 2-input OR gate 74 of the control circuit outputs a signal to fog light driver 76 of a fog light turning on fog lights 78, 78'. When fog light switch 80 is turned on, 2-input OR gate 74 of the control circuit outputs, a signal to fog light driver 76 turning on fog lights 78, 78' it will be appreciated by those skilled in the technical field of the invention that the power sources are the battery and generator of the vehicle.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A circuit for automatically activating headlights and fog lights of a vehicle during operation of a dual-speed vehicle windshield wiper comprising;

a headlight switch and a fog light switch for connecting respective operating circuits of the headlights and fog lights, respectively, to a vehicle power source, and a two position wiper switch for connecting respective low and high speed operating circuits of a dual-speed wiper motor of the vehicle to the vehicle power source, and control circuit means connecting the headlight operating circuit and fog light operation circuit to respective low and high speed positions of the wiper switch circuit whereby, in a first, low speed position of the wiper switch the control circuit means actuates the headlight operating circuit and, in a second, high speed position of the wiper switch, the control circuit means activates both the headlight operating circuit and the fog light operating circuit thereby to operate both headlights and fog lights simultaneously, wherein said control circuit means comprises:

a 3-input OR gate whose inputs are said headlight switch and contacts of the low and high speed positions of said wiper switch, a headlight driver whose input is the output of said 3-input OR gate and whose output operates said headlights;

a wiper motor driver whose input is the contact of the low speed position of said wiper switch and whose output is connected to a contact of a low speed circuit of said dual-speed wiper motor;

a wiper motor drive whose input is the contact of the high speed position of said wiper switch whose output is connected to a contact of high speed circuit of said dual-speed wiper motor; and, a 2-input OR gate having inputs connected to said fog light switch and the contact of the high speed position of said wiper switch, and fog light driver whose input is the output of said 2-input OR gate and whose operates said fog lights.

* * * * *